US011127112B1

United States Patent
Ryden

(10) Patent No.: US 11,127,112 B1
(45) Date of Patent: Sep. 21, 2021

(54) WARPING AUGMENTED REALITY ENVIRONMENTS AND VIEWPOINTS FOR ENHANCED ROBOTIC TELEOPERATION

(71) Applicant: BluHaptics, Inc., Seattle, WA (US)

(72) Inventor: Olof Fredrik Ryden, Seattle, WA (US)

(73) Assignee: Bluhaptics, Inc., Seattle, WA (US)

( * ) Notice: Subject to any disclaimer, the term of this patent is extended or adjusted under 35 U.S.C. 154(b) by 0 days.

(21) Appl. No.: 16/843,255

(22) Filed: Apr. 8, 2020

Related U.S. Application Data

(60) Provisional application No. 62/831,634, filed on Apr. 9, 2019.

(51) Int. Cl.
*G06T 3/00* (2006.01)
*G06T 19/00* (2011.01)
*G06T 3/40* (2006.01)

(52) U.S. Cl.
CPC .......... *G06T 3/0093* (2013.01); *G06T 3/4038* (2013.01); *G06T 19/006* (2013.01)

(58) Field of Classification Search
CPC ... G06T 3/0093; G06T 19/006; G06T 3/4038; B25J 19/02; B25J 19/021; B25J 19/023; B25J 19/04
See application file for complete search history.

(56) References Cited

U.S. PATENT DOCUMENTS

2003/0013949 A1\* 1/2003 Moll ...................... A61B 34/35
600/407
2018/0350132 A1\* 12/2018 Paulson .................. G06T 17/10

\* cited by examiner

*Primary Examiner* — Jeffery A Brier
(74) *Attorney, Agent, or Firm* — Davis Wright Tremaine LLP

(57) ABSTRACT

Techniques for simplifying a user interface by transforming a model and inversely transforming commands for controlling a remote device based on the transformed model are described herein. A computer system determines a warping transformation, applies the transformation to a model, and provides the transformed model to an operator display. The operator, referencing the transformed model, provides a movement command to a remote device reduces robot and the computer system inversely transforms the command to correspond to the space of the remote device.

20 Claims, 12 Drawing Sheets

WARPING AUGMENTED REALITY ENVIRONMENTS AND VIEWPOINTS FOR ENHANCED ROBOTIC TELEOPERATION

CROSS-REFERENCE TO RELATED APPLICATIONS

This application claims priority to U.S. Provisional Patent Application No. 62/831,634, filed Apr. 9, 2019, entitled "WARPING AUGMENTED REALITY ENVIRONMENTS AND VIEWPOINTS FOR ENHANCED ROBOTIC TELEOPERATION," the disclosure of which is hereby incorporated by reference herein in its entirety.

BACKGROUND

Representing real-world three-dimensional spaces in a virtual reality environment is complex and challenging. Standard practice for robotic teleoperation is to use video cameras that overlook manipulators in the task space and stream the video to an operator. These streams are typically viewed on standard monitors and the operator has limited depth perception and limited spatial awareness. Spatial structure is inferred from multiple displays, resulting in human operators processing excess information in an unnatural way.

BRIEF DESCRIPTION OF THE DRAWINGS

Various techniques will be described with reference to the drawings, in which.

DETAILED DESCRIPTION

Figure 1:
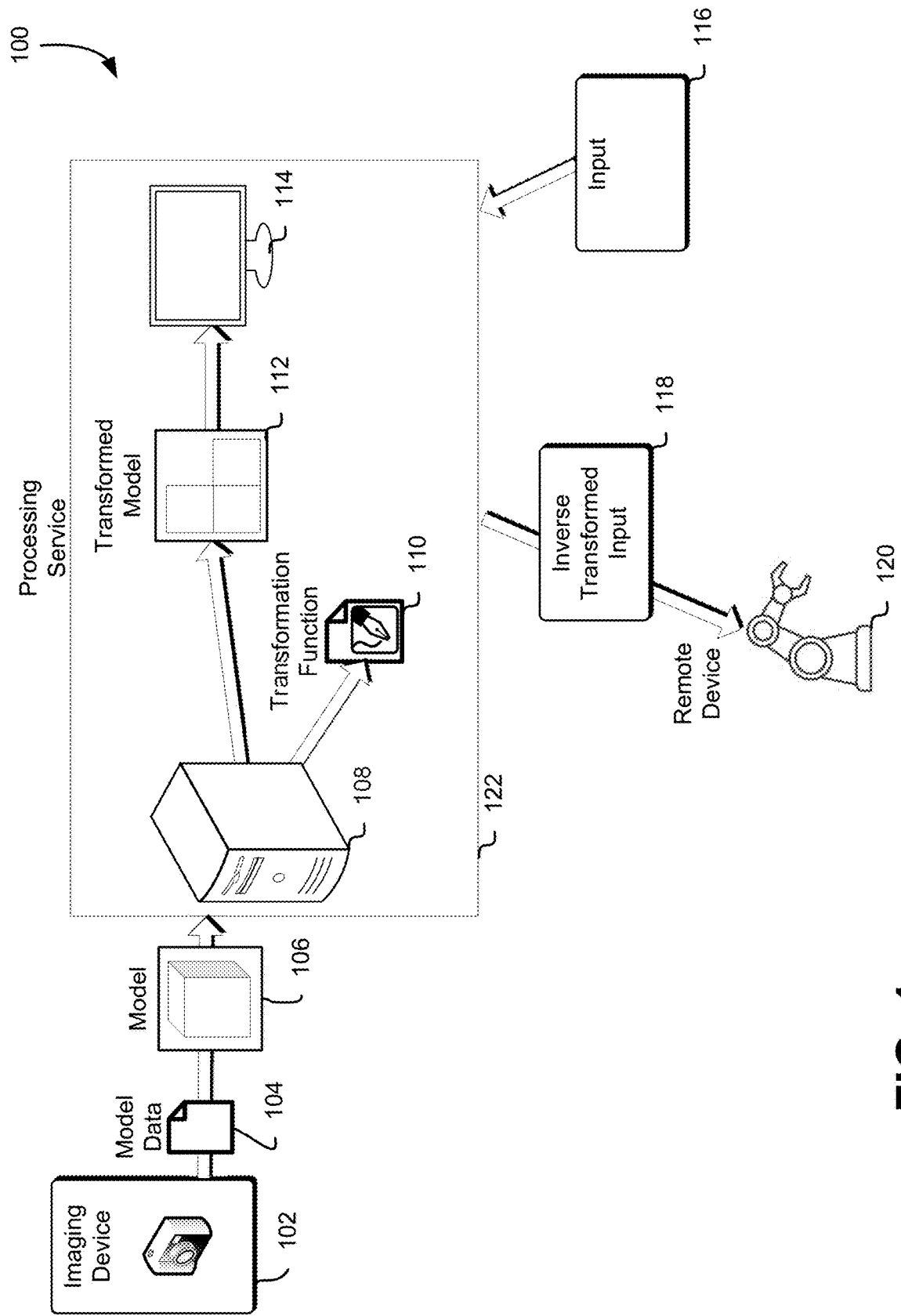
FIG. 1 illustrates an environment in which a computing system may process a model, provide the transformed model to an operator display, receive operator commands based on the transformed model, and provide inverse transformed commands to a remote device.

In the following description, numerous specific details are set forth such as specific computational methods, equations, parameters, etc. in order to provide a thorough understanding of the present invention. It will be obvious, however, to one skilled in the art that these specific details may not be needed in order to practice the present invention. In other instances, well-known processing steps have not been described in detail in order to avoid unnecessarily obscuring the present invention. Examples should be taken as being illustrative in nature and not limiting to the scope of the disclosure.

A traditional rectilinear field-of-view for a complex real-world three-dimensional space is limited by a minimum effective focal length of an imaging device. This limitation can be circumvented by using a wide-angle or anamorphic lens and accepting some optical distortion or warping to the resulting image. Such optical distortion, however, results in non-proportional distances between points across the image. A perceived distance between points across the image that does not account for the optical distortion at those points can be error-prone, resulting in inconsistencies in perceived distances between points in the image compared to actual distances between corresponding points in real space. Further, when robotic movement is commanded based on the warped model, such inconsistencies in perceived distance can negatively affect robotic movement in real-world space, and can result in error-prone movements and unintended consequences. For example, a rectilinear command based on a distorted or warped model can result in non-rectilinear robotic movement as viewed in the image.

Techniques and systems described below relate to a means for transforming an image by processing it to have less distortion and inverse processing so that a command issued based on the processed image has an inverted transformation applied for observing and controlling movement of robotic teleoperations. In particular, techniques are disclosed for utilizing computer system processor capabilities to identify and determine image distortion, determine a transformation to change or reduce image warping, apply the warping transformation to the warped model, and apply the inverse transformation to an input where the input is based on the transformed model. A transformation may also be referred to as a transformation function or algorithm.

Additionally, robotic teleoperation can be supported by multiple imaging devices producing traditional rectilinear images. With multiple rectilinear images, an operator can be presented with an expanded field-of-view in a format with negligible optical distortion. Further, the rectilinear images enable the operator to issue commands based on the rectilinear images that correspond to rectilinear robotic movement as viewed in the image. One or more of the multiple rectilinear images can be displayed on one or more visual displays. In many cases, the one or more displays are size limited such that a human operator viewing the multiple displays needs to shift their focus between all of the images to view each image. A human operator can also need to physically move their head to view all of the displayed rectilinear images, such as when using a virtual reality display. As will be appreciated by one skilled in the art, multiple images can alternatively be stitched together to form a composite view of a virtual reality environment. For example, multiple images of different views may be joined together to result in a larger view. As techniques are disclosed for utilizing computer system processor capabilities to warp an image, so too may the techniques be applied to multiple images to form a composite warped model.

A warped or distorted view, or warped or distorted image, may refer to a three-dimensional (3D) representation of a real world environment captured by an imaging device where the image enables a model to represent the scene. The model may be two-dimensional (2D) or 3D or include more dimensions. The model may represent topography of a surface. For example, the image can be a digital image obtained from data associated with 3D sensors, two-dimensional (2D) sensors, simultaneous localization and mapping (SLAM) sensors, or other sensors suitable for generating image data that can enable building a 3D model of at least a portion of a real world environment.

The image may be a distorted image or contain a distorted view as a result of being captured by an imaging device where the optical capturing of light may involve an optical aberration. For example, the image can be a digital image represented by pixel data as light interacted with a lens and a sensor on a digital imaging device or camera. Optical aberrations can result from imperfections in the lens, imperfections in the sensor, or natural limitations associated with the lens, sensor, or imaging device. As will be appreciated by one skilled in the art, such an optical aberration can manifest as a geometrical distortion, for example, positive radial distortion ("barrel" distortion) and negative radial distortion ("pincushion" distortion). Optical aberration distortion can also be complex, for example a combination of positive and negative radial distortions. As will be appreciated by one skilled in the art, optical aberrations can apply to both wide angle curvilinear lenses and wide angle rectilinear lenses, such that a captured image can appear to be fisheye-like or squeezed/stretched. In some instances, a distorted view or image is corrected before it is processed.

Distortion and warping can also result from the perspective at which the image is captured. For example, when a series of uniform objects are arranged receding from the location of the imaging device, such as along a depth axis, objects nearer to the imaging device can appear larger than those objects farther from the imaging device. As will be appreciated, distortion at one point in the image may be different, such as having a greater degree or amount of distortion, than another point in the image. While an image can be said to be warped, a point within the image, for example at the center of the image, may not be warped. In such an image, a point along the edge the image can be warped while the center is not warped. Accordingly, distortion may refer to a portion of an image relative to another portion of an image, relative to the image as a whole, or relative to a standard format.

A standard format may be represented by a rectilinear representation of the image. As such, a warping amount may refer to how distorted or warped a portion of an image is relative to, for example, a standard format. An amount of warping may also be represented by one or more warp parameters in an algorithm for transforming the distorted, warped, or distorted and warped model to reduce or adjust distortion or warping such that image features, such as pixels, may be shifted relative to a standard format. For instance, distortion of an image may be determined based on a warping function that takes two or three-dimensional coordinates as inputs and outputs other coordinates onto which the input coordinates are mapped. For instance, a function may map a curved surface to a flat surface. Alternatively, a function may map 3D surfaces of nonparallel planes to appear as collectively on a parallel plane. The parameters may be constants or other components of such a function. Parameters may include the difference of distance and orientation between corresponding pixels of the distorted or warped model relative to the standard format. It will be appreciated that distortion across an image may not be uniform and that an associated transformation will modify features of an image in a non-uniform manner. For example, features near the center of an image may be warped less than features closer to the perimeter of the image such that an appropriate transformation non-uniformly modifies all portions of the image. Parameters may also be derived from information associated with an imaging device's location and orientation, for example, in relation to the remote device. Further, parameters may be derived from environmental data, such as a determined distance from the imaging device to an object in the image or a determined distance between objects in the image. A warping transformation may be determined from the warp parameters and be applied to the warped model to reduce such distortion or warping and enable an inverse transformation. In some embodiments, a distorted view or image is corrected before it is processed. In such embodiments, distortion parameters may be associated with the image data.

An image or corresponding model, or data associated with a visual or optical representation of a real-world scene in a physical space, is provided to a computing system for processing. It will be appreciated that a real-world scene is not limited to a terrestrial space. In some embodiments, the real-world scene may exist in outer space. For example, the real-world scene may be a representation of the operating environment of a robotic device, such as associated with a spacecraft. The real-world scene may be an operational environment of a remote device capable of moving within the model. The model may include, for example, multiple objects that may be determined or otherwise recognized. The model may include, for example, an object currently operated on by a remote device. The model may, for example, exclude one or more objects in the real-world scene.

The image, or model, may be compressed or combined with information associated with the image. The image may be in a suitable image format for displaying two-dimensional models, such as: tagged image file format (TIFF), joint photographic experts group (JPEG), graphic interchange format (GIF), portable network graphics (PNG), or a raw format associated with the imaging device.

The image may be in a suitable format for displaying three-dimensional models, such as: stereolithography (STL), object (OBJ), Filmbox (FBX), COLLAborative Design Activity (COLLADA), Autodesk 3D Studio (3DS), Initial Graphics Exchange Specification (IGES), Standard ISO 10303 (STEP), and Virtual Reality Modeling Language/ISO/IEC 19775/19776/19777 (VRML/X3D), or a format associated with the imaging device.

As discussed, the image or model can be a digital image captured by an imaging device, such as a digital imaging device, camera, video camera, stereo camera, range sensor, 3D sensor, or sensor array. The imaging device can be mounted in a suitable location to observe movement of a remote device, such as a robot. The imaging device can be mounted to a surface or component of the remote device. The remote device can be capable of movement. The imaging device may be mounted in such a way that the imaging device may rotate or otherwise adjust orientation. In this manner, the imaging device can be moved such that the observable field of view of the imaging device can be shifted or altered.

The model may be provided to the computing system over a suitable network for providing or transmitting information, such as a digital file. The computing system is capable of processing the model, such as by a single processor or multiple processors. Processing the model includes determining whether the model is warped, distorted, or both. Such a determination can involve comparing the model to a standard format or standard model. The determination can involve recognizing objects within the model and comparing those recognized objects with standardized models of those objects. For example, determining boundaries of an identified object within the model and comparing those boundaries to a dictionary of defined object boundaries may result in a recognized object. Instead of objects, the determination may compare recognized surfaces within the model to standardized models of those surfaces. For example, determining edges of an identified surface, such as a wall, and comparing those edges to a dictionary of defined surface edges, may result in a recognized surface. A determination may involve adjusting the size or angle of perspective of the identified object or surface to a suitable size or perspective relative to the dictionary defined models. Alternatively, the determination may involve adjusting the size or angle of perspective of the dictionary defined object or surface to a suitable size or perspective relative to the identified object or surface. The determination can involve machine learning. Further, the computing system can determine the amount of distortion of the model relative to the standard format or standard model. The amount of distortion can be written in a suitable storage medium and stored in a suitable temporary or persistent storage resource or device. The amount of distortion can be in a format capable of tracking version iteration or time.

In this manner, the computing system can determine, for example, that a model should be warped, the amount of warping in the model, and apply an algorithmic procedure to the model to reduce or otherwise correct the warping so as to transform the model. The result of the transformed model may be to approximate the view represented by a standard format or standard model. The result of the transformed model may be a projection, such as a 2D projection of a 3D model. In this manner, an operator may still view the 2D model in 3D space. For example, the sides of a box projected onto a single plane may retain their topography and an operator may rotate the plane at different angles relative to a selected point of view. The algorithmic procedure may, for example, apply a mathematical adjustment to the model. The distortion may be reduced or otherwise corrected by, for example, modifying a bitmap or pixel data in a digital image. Modifying a bitmap or pixel data can include shifting, migrating, or copying data from a pixel location to a different pixel location. Modifying a bitmap or pixel data can also include algorithmically adjusting values associated with pixel data, such as adjusting the value associated with a position or color of a pixel.

For example, a spherical object in a model can be distorted such that it appears non-spherical or oblong, or otherwise distorted. Applying the algorithmic procedure to an object may morph the appearance of the object, such as to approximate a different model of the object. For example, the algorithmic procedure may, when applied to the distorted spherical object, morph the appearance of the object to approximate a spherical appearance to reduce distortion. The transformed model may portray that dimensions change relative to the sizes of objects in the real-world scene or change relative to data from the scene that was captured by the imaging device. It will be appreciated that an approximation may reduce distortion or may completely eliminate distortion. In this manner, a warping transformation to the reduced distorted model may warp similar objects in a similar and predictable manner.

A processing service may determine that some portions of an image may be modified differently than other portions of a model. For example, the processing service may determine that a model includes multiple objects with empty or void space between them. The processing service may warp the model such that a determined distance between objects greater than a threshold amount is reduced to below the threshold amount. Reducing distances between objects below the threshold amount may, for example, cause the objects to appear closer or adjacent to each other. In this manner, empty or void space may be virtually collapsed.

The algorithmic procedure may be selected by a processing service, such as a computing system, computing device, machine learning, a human operator, or by a combination thereof. The algorithmic procedure may be selected from a function set of preconfigured functions or by machine learning or a combination thereof. For example, an operator or a computing system may identify a preconfigured algorithmic procedure that is associated with a similar distortion to the warped model and machine learning automatically identifies modifications to the identified preconfigured algorithmic procedure that, when applied, optimize the standardization of the warped model when the warped model is transformed. The algorithmic procedure selected may be stored in temporary or persistent storage. The stored algorithmic procedure may be stored in a format capable of tracking version iteration or time, or may be stored with an association to the warped model, the transformed model, or both. Machine learning can select the algorithmic procedure based on a recognized object, surface, or other indicator in an image that varies relative to a standardized object. The algorithmic procedure may be trivially inverted. The algorithmic procedure may have a one-to-one mapping with the inverse algorithmic procedure.

The processing service may recognize the space represented in the model. For example, the model may be provided to the processing service as part of model data. The model data may include information indicating a defined space for which the model represents. For example, the imaging device may be mounted on a remote device occupying the inside of a storage locker, such as a cube. The imaging device may be positioned, at the time the warped view was captured, on a face of the six faces of the inside of the cube. The warped model may include imaging of the remaining five faces of the inside of the cube. The model data may include information about the dimensions of the cube, or the dimensions of the cube may otherwise be defined and provided to the processing service. With the dimensions of the storage locker defined for the model, the processing service may determine the appropriate algorithmic procedure to transform the model.

The resulting transformed model may display adjacent surfaces as appearing as substantially one joined surface for an operator to view. In this manner, a view, such as wide-angle view, of a multi plane space may be provided as a transformed model of a substantially single plane space enabling an operator to experience less cognitive load in viewing the operating space of a remote device. In some examples, the result of the transformed model may be a projection, such as a 2D projection of a 3D model. In this manner, an operator may still view the 2D model in 3D space. For example, the sides of a box projected onto a single plane may retain their topography and an operator may rotate the plane at different angles relative to a selected point of view.

The processing service may also determine that the model includes an object positioned within the space represented, such as a storage locker. The processing service may recognize such an object after the model is transformed and determine the objects positioning relative to the remote device. The processing service may determine a movement mapping for at least a component of a remote device to access the determined objects. The processing service may determine objects by a computing system, computing device, machine learning, a human operator, or by a combination thereof.

The transformed model can be provided to an output device over a suitable network for providing or transmitting information. An output device may be a display device that can be suitably configured to render the transformed model. The rendered transformed model may be displayed such that an operator can view the transformed model with the reduced, changed, or increased amount of warping. The operator can also view the model. The display may be any suitable device for viewing images, such as: an electroluminescent (EL) display; a cathode ray tube (CRT); a flat-panel device such as liquid crystal (LC) display, LC display with light-emitting diode (LED)-backlit, LED display, or plasma (P) display; a projection device; or other display device. The display can be a standalone device or part of a system. For example, the display can be a monitor or screen connected with a computing device. The display can also be part of a virtual reality (VR) system, for example a VR headset or VR goggles.

The display used may substantially occupy an operator's field of view. In general, use of the term "output device" is intended to include all possible types of devices and mechanisms for outputting information from the computing system or device. A user interface output device can be used, for example, to present user interfaces to facilitate operator interaction with applications performing processes described and variations therein, when such interaction may be appropriate. It will be appreciated that snapshots of 3D models may be displayed as 2D images due the constraints of the display. In some examples, 3D display systems may be able to render 3D models as 3D images.

The computing device can utilize local computing systems on connected hardware or utilize networked computing systems. The computing device may process inputs from an input device. The input device may be a controller activated by an operator. The computing device can receive inputs from the controller. Inputs may be processed by the computing device or provided to networked computing systems. An input, such as a command, can correspond to movement of at least a component of a remote device, such as for robotic teleoperation. The input device or controller can be any suitable device for accepting inputs from an operator, such as a keyboard; pointing devices such as an integrated mouse, trackball, joystick, gamepad, touchpad, touchscreen incorporated into the display, or graphics tablet; scanner; audio input devices such as voice recognition systems or microphones; and other types of input devices. In general, use of the term "input device" or controller is intended to include all possible types of devices and mechanisms for inputting information to the computing device or computing system.

The input command may be provided to the computing device or to a computing system for processing. The input command can be in reference to the model or the transformed model. Processing the command can include accessing the selected algorithm used to transform the model to the transformed model. Processing can include inverting the selected algorithm to apply an inverse transformation to the command. The inverted command can be provided to the remote device, such by transmitting the inverted command as a data packet over a computer network. The remote device can be a robot, such as a robot used with teleoperation. The remote device may be comprised of moveable components, such as hinged, rotating, or telescoping arms.

The processing service may determine commands to cause the device to navigate in the real-world scene corresponding to instructions provided based on the view. For example, an operator may cause a first input for commanded movement that directs the remote device to circumnavigate an object in a complex path, such as depicted in a transformed model. However, as a result of execution of the inverse transformation, the complex first input may result in a second input corresponding to navigating the remote device in a direct path that similarly avoids the object within the real-world scene. The processing service may also determine that the first input for commanded movement avoids an object in the transformed model and checks that the second input results in a navigation that avoids the object.

Additionally, the processing service may receive an input indicating a result of navigation of the remote device in the view of the real-world scene. Based on the result, the processing service may determine a set of commands to cause the device to achieve the result in the real-world scene. For example, an operator may issue a command for the remote device to retrieve an object in the real-world scene by utilizing the processing service's ability to recognize an object within the model and determine the object's position relative to the remote device. In such an instance, the processing service may determine a set of navigation commands for the remote device to move towards the object and acquire the object. Alternatively, an operator may issue a command for the remote device to store an object in the real-world scene by utilizing the processing service's ability to recognize surfaces within the model and determine a suitable location to the store the object. In such an instance, the processing service may determine a set of commands for the remote device to navigate about the recognized surface to the store location and store the object.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described. Presented examples and the depiction of features in the figures should be taken as being illustrative in nature and not limiting to the scope of the disclosure.

As one skilled in the art will appreciate in light of this disclosure, certain embodiments may be capable of achieving certain advantages, including some or all of the following: (1) simplified user interface (e.g. (a) improving the ability of the computing system, computing device, or display to present information, and (b) reducing the cognitive load on an operator)), and (2) increasing accuracy, precision, and fidelity of input controls for robotic teleoperation. By transforming the view to a standardized format or model, or an approximation of a standardized format or model, an operator can be presented with a standard view of a space associated with a remote device.

In accordance with at least one embodiment, such as for teleoperation of a spacecraft involving high-latency prone electromagnetic wave communications, transforming a model of an operating space for a remote device to a standard format enables an operator to more quickly determine the operating space and consider appropriate inputs, such as for a commanded movement of the remote device. For example, the operator can input a rectilinear command for movement of a remote device where the movement corresponds to a rectilinear, or approximately, rectilinear transformed model. However, it will be appreciated that the input command would be associated with the transformed model. The command can then be inversely transformed by a computing device or computing system with the inverse transformation occurring with a speed, accuracy, precision, or fidelity not reasonably practical by a human operator. Additionally, a transformed model in a standard format known by the operator would enable the operator to decide a command faster from reduced cognitive load associated with knowing the standard format compared to if the operator was presented with models of varying warp formats. In high-latency environments involving a remote device, such as for a spacecraft operated by ground control, an ability for an operator to make decisions faster improves the efficiency of the operator controlling the remote device by reducing operator time spent understanding a displayed image of the operating space and reducing errors associated with misunderstanding the displayed image.

Techniques disclosed and described herein include techniques to recognize or determine distortion in an imaged model, techniques to transform such models according to a warping, and techniques to inversely transform commands based on such warped models. A computing system may first determine that an image is already warped and the transformation is to update the warping due to changed circumstances. In some embodiments, a computing system may compare recognized or known surfaces in the model to a standard model. In some embodiments, the computing system may compare recognized or known object in the model to a standard model of the object. In some embodiments, such recognition or determination may be facilitated by machine learning.

In an embodiment, a processing service may determine that a boundary edge recognized in the image may be angled or curved relative to a boundary edge in a standard model. Similarly, a computing system may determine that a recognized object in the image is warped relative to a standard model of the object. In some embodiments, such recognition or determination may be facilitated by machine learning. A computing system may determine an amount of distortion in the image. The amount may correspond to one or more variables in an algorithmic procedure for reducing image distortion. The algorithmic procedure may be applied to the image to transform the image to be less warped, distorted, or both. The transformed model may be provided to a display for an operator who may input a command for movement of a remote device operating in the environment represented in the image. The input commands may be inversely transformed by a processing service before providing the inversely transformed command to the remote device. The inverse transformation may correspond to at least part of the inverse of the algorithmic procedure. As may be contemplated, these techniques are merely illustrative examples and other such techniques may be considered as within the scope of the present disclosure.

In some embodiments, a processing service receives information including data associated with an image. The data associated with an image, or image data, may include information about the location and time the image was generated. For example, the image data may include information defining the space represented in the imaged model, for example an identifier corresponding to orientation, position, or direction the imaging device was in when the model was generated.

In some embodiments, an image may be generated by an imaging device, such as a camera, array of cameras, or other combination of multiple imaging devices. An imaging device may generate an image from an optical lens, for example a wide angle lens, prone to producing distortion in a generated image. Distortion may manifest as some curvilinear warping of rectilinear image features, for example the warping may be positive radial distortion ("barrel" distortion), negative radial distortion ("pincushion" distortion), or combination of positive and negative radial distortions. Additionally, distortion may represented by a characterization along a field of depth that is, in some embodiments, not desired. For example, an image of a uniform rectilinear grid may appear to be curved at some points across the image. Additionally for example, an image of a uniform rectilinear grid overlaid on the surfaces of a cube may appear to become angled when transitioning over an edge of the cube from one face of the cube to a different face of the cube.

In some embodiments, the imaging device be moved from its position to a different position to enable generation of a different image. For example, the imaging device may be attached to a remote device capable of receiving commands for movement. In some embodiments, multiple imaging devices may have been arranged such that the image generated by one or more cameras is different, for example at a different angle of view, from an image generated by a different imaging device of the multiple imaging devices. In this manner, multiple images of various angles of view may be produced that may be combined into a single combined image. When combined, the combined multiple images may yield a field of view greater than the field of view of any one image. For discussion, the combined image may be referred to as "the image."

In some embodiments, the image is provided to a processing service. The processing service may determine whether the image includes warping and an amount of warping associated with the image or points within the image. The processing service may access a standard model, a previous model, or a machine learning protocol from a data store. The determination may be in reference to a standard model, by comparing multiple images, by manual selection of a point or points within the image, or by machine learning. The processing service may use the determined amounts of warping to generate a warping transformation. The warping transformation would enable transformation of the image to a transformed model with reduced, changed, or increased warping depending on the operator's preference. Alternatively, the processing service may determine that a preconfigured algorithm accessible at a data store would enable transforming the image to a transformed model of desired warping. The data store may be associated with a computing system, computing device, or a storage device.

In some embodiments, the processing service may determine that accessing such a preconfigured algorithm may require less processing time than generating a transformation. The processing service would enable the image to be transformed with the determined transformation to provide a transformed model. In some embodiments, the processing service may store the determined transformation in a suitable storage medium. In some embodiments, the processing service may associate the transformation with the image, with the transformed model, or both.

In some embodiments, the processing service may use the transformation, the image, the transformed model, or a combination thereof to provide a visual overlay for the image, for example a heat map. A visual overlay indicating how much a point in the transformed model has been transformed relative to the image may enable an operator to view the extent of warping present in the transformed model. In such an example, relative amounts of reduced or changed warping may be color-coded in the visual overlay to improve an operator's ability to quickly determine how much a portion of the image is transformed. In some embodiments, the image, transformed model, heat map, or combination thereof may be provided to a display device suitable for displaying images. In some embodiments, the operator may be enabled to toggle between views, such as between viewing the model, transformed model, and heat map.

In some embodiments, an input, such as a command, may be received by the processing service. The input may be generated by an operator of a remote device and correspond to a commanded movement of a remote device, such as for robotic teleoperation. In some embodiments, the input may be in relation to a transformed model. The processing service may access the transformation algorithm associated with the transformed model, generate the inverse transformation algorithm for the input, and apply the inverse transformation to the input to yield an inverse transformed input. In some embodiments, the inverse transformed input, such as an inverse transformed command for movement, may be provided to the remote device.

In some embodiments, the processing service may evaluate the input, inverse transformed input, or both, to determine if the associated movement of the remote device exceeds a threshold value. For example, an input command may indicate a given movement that an operator may perceive as below a threshold value but the inverse transformed command would indicate a movement greater than the threshold value. Specifically for the example, a commanded movement of the remote device along the perimeter of a transformed model, such that the transformed model includes reduced fisheye distortion along the perimeter of the corresponding image, may correspond to an inverse transformed command of relatively higher magnitude. In some embodiments, the inverse transformation may change the coordinate system used for an input. For example, an input may be in reference to a Cartesian coordinate system whereas the inverse transformed input may be in reference to a polar coordinate system.

In some embodiments, when such a threshold value is exceeded, the processing service may generate an exception or alert. For example, the processing service may alert an operator that an input command exceeds a threshold value or request that the operator confirm such an input that exceeds the threshold value. In some embodiments, the alert may be provided to the display. The alert may include information corresponding to the corresponding input value, the corresponding inverse transformed input value, or a combination thereof.

In some embodiments, the processing service may be operated by a computing system, a computing device, or a distributed system. For example, a distributed system may include a computing system for processing the transformation, applying the transformation to an image, and providing the transformation and transformed model to a computing device. Further, the distributed system may include a computing device that accesses the transformation and processes an input based on the transformed model to provide an inverse transformed command to a remote device.

In some embodiments, the remote device may include a teleoperated robotic arm that may be mounted on a mobile base. The robotic arm may be capable of obtaining implements, for example, tools. The mobile base may be capable of moving, for example by wheels or tracks. In some embodiments, the remote device may travel to retrieve an implement, for example move to a tool storage location by its mobile base and retrieve a tool by its robotic arm. An imaging device may be situated at the storage location and at an operation location. In this manner, and as discussed above, a view of both the storage location and the operation location may be warped such that the distance between them is collapsed and the locations appear together to an operator. An operator may command, for example, that the remote device retrieve an implement from the storage location and then travel to the operation location. As the distance and associated travel from storage location to the operation location is collapsed in the operator's warped view, the remote device may autonomously travel between the storage location and operation location. Such autonomous travel may, for example, be commanded by a processing service and in accordance with the transformation to collapse distance between the storage location and the operation location.

In some embodiments, multiple remote devices may be deployed to perform a series of operations. The series of operation may be in a particular order. The multiple remote devices may be deployed together to an operation location. Each remote device of the multiple remote devices may be specialized to perform specific operational tasks. Depending on the task commanded by an operator, the processing service selects which of the remote devices performs the task. In some embodiments, an imaging device enables the operator to view the operation location separate from the presence of the remote devices at the operation location. In this manner, the operator may command a series of operations that may be stored by the processing service for execution by one or more remote devices at a later time. The series of operations may be stored according to a particular order that may be replayed according to that order by the one or more remote devices.

In some embodiments, the displayed view of a real world scene may enable an operator to toggle between objects or features of similar characteristics. In some embodiments, objects or features for be recognized or determined through the use of computer processors, utilizing machine learning, by operator defining, or a combination thereof. For example, a real world scene may include multiple types of cabling, such as for electrical or hydraulic purposes. As discussed above, the operator may be able to toggle between various displayed views, including varied warping scenarios. In this manner, an operator may be able to toggle between views including, for example, isolate or highlight a first type of object, and isolate or highlight a second type of object.

In some embodiments, the real world scene may not be substantially static. Areal world scene may be in motion, such as proceeding along a vectored path or oscillating. For example, a real world scene may be an operational environment in outer space on a satellite moving at a predictable or measurable speed and trajectory. Areal world scene could also be a subsea operational environment with predictable or measureable currents, flows, or tides. Such dynamic real world scenes may include forces that influence motion of a remote device or an object within the operational environment. Accordingly, the processing service may account for these perturbations in a transformation function to warp the operational environment, an object within the operation environment, or a combination thereof to appear substantially static.

In some embodiments, one or more transformation functions may be utilized to account for various warping parameters. For example, a transformation function may be applied to a view of a real world scene to collapse distances between operational locations or between objects in the scene. Separately or in combination, a transformation function may be applied to warp a view of a real world scene including multiple plane surfaces to appear such that some of the surfaces exist adjacently on a similar plane. Separately or in combination, a transformation function may account for motion of the operational environment or by an object in the operational environment.

FIG. 1 illustrates an example environment 100 where an input based on a transformed model is inversely transformed before being provided to a remote device operating in the space represented in the transformed model, in accordance with at least one embodiment. An imaging device 102 may generate an image data 104, including at least an image 106. The imaging device 102 may be in proximity to or attached to a remote device 120. The imaging device may provide the image data 104 to a processing service 122. In accordance with at least one embodiment, the processing service 122 includes a computing system with one or more computing system processors and a data storage system. In various embodiments, the computing device 108 may be used to implement any of the systems illustrated herein and described throughout. For example, the computing system may be a computing device 108 configured for use as a data server, a web server, a portable computing device, a personal computer, or any electronic computing device. The computing device 108 may include one or more processors that may be configured to communicate with, and are operatively coupled to, a number of peripheral subsystems via a bus subsystem. The processors may be utilized for the traversal of decision trees in random forest of supervised models in embodiments of the present disclosure (e.g., cause the evaluation of inverse document frequencies of various search terms, etc.). These peripheral subsystems may include a storage subsystem (such as data store 412), comprising a memory subsystem and a file storage subsystem, one or more user interface input devices, one or more user interface output devices, and a network interface subsystem.

Such storage subsystem may be used for temporary or long-term storage of information such as details associated with transactions, databases of historical records, and storage of decision rules of supervised models in the present disclosure.

The bus subsystem may provide a mechanism for enabling the various components and subsystems of a computing device, such as computing device 108, to communicate with each other as intended. Although the bus subsystem may be a single bus, alternative embodiments of the bus subsystem may utilize multiple busses. The network interface subsystem may provide an interface to other computing devices and networks. The network interface subsystem may serve as an interface for receiving data from, and transmitting data to, other systems from the computing device, such as computing device 108. For example, the network interface subsystem may enable a data technician to connect the device to a wireless network such that the data technician may be able to transmit and receive data while in a remote location, such as a user data center. The bus subsystem may be utilized for communicating data, such as details, search terms, and so on to the supervised model of the present disclosure, and may be utilized for communicating the output of the supervised model to one or more processors and to technicians and/or operators via the network interface.

The storage subsystem may provide a computer-readable storage medium for storing the basic programming and data constructs that may provide the functionality of at least one embodiment of the present disclosure. The applications (programs, code modules, instructions) that, when executed by one or more processors, may provide the functionality of one or more embodiments of the present disclosure, and may be stored in the storage subsystem. These application modules or instructions may be executed by one or more processors. The storage subsystem (such as data store 412), may additionally provide a repository for storing data used in accordance with the present disclosure. The storage subsystem may comprise a memory subsystem and a file/disk storage subsystem.

The memory subsystem may include a number of memories including a main random access memory (RAM) for storage of instructions and data during program execution and a read only memory (ROM) in which fixed instructions may be stored. The file storage subsystem may provide a non-transitory persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media. The computing device, such as computing device 108, may include at least one local clock. The local clock may be a counter that represents the number of ticks that have transpired from a particular starting date and may be located integrally within the computing device. The local clock may be used to synchronize data transfers in the processors for the computing device and all of the subsystems included therein at specific clock pulses and may be used to coordinate synchronous operations between the computing device 1300 and other systems in a data center.

In one embodiment the local clock is an atomic clock. In another embodiment, the local clock is a programmable interval timer. The computing device, such as computing device 108, may be of various types including a portable computer device, tablet computer, a workstation, or any other device described below. Additionally, the computing device may include another device that may be connected to the computing device through one or more ports (e.g., USB, a headphone jack, Lightning connector, etc.). The device that may be connected to the computing device 1300 may include a plurality of ports configured to accept fiber-optic connectors. Accordingly, this device may be configured to convert optical signals to electrical signals that may be transmitted through the port connecting the device to the computing device for processing. Due to the ever-changing nature of computers and networks, the description of the computing device (such as the computing device 108 in FIG. 1) is intended only as a specific example for purposes of illustrating the preferred embodiment of the device. Many other configurations having more or fewer components than the system depicted in FIG. 1 are possible.

In accordance with at least one embodiment, the processing service 122 receives the image 106 and determines a warping amount associated with the image 106. The determination may be the result of comparing the model to a standard model or standard format. The determination may involve recognizing an object within the image and comparing the recognized object with a standardized model of that object. Instead of an object, the determination may compare a recognized surface within the image to standardized model of that surface. The recognition or determination may invoke machine learning to aid in comparing the image to a standard model or standard format, comparing recognized objects to a standard model of that object, comparing a recognized surface with a standardized model of that surface, or a combination thereof.

Once the processing service 122 has determined the warping amount, the processing service uses the warping amount to determine a transformation 110. The transformation 110 may be determined by accessing a suitable preconfigured transformation from storage as one of a set of preconfigured transformations, the suitable preconfigured transformation based on the warping amount. The transformation 110 may also be generated from the warping amount. The processing service 122 applies the transformation 110 to the image 106 to yield the transformed model 112. The transformed model 112 is provided to a display device 114 for an operator to view the transformed model 112. The transformed model 112 may be provided as a snapshot or image in a suitable format for rendering by the display device 114.

An operator causes an input 116 based on the transformed model 112 to be provided to the processing service 122. The input 116 may be a command for a movement associated with the remote device 120. The input 116 may be caused by user interface input devices, which may include one or more user input devices, such as a keyboard, pointing devices such as an integrated mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to the computing device 108, or to the processing service 122. User interface output devices may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 108, or processing service 122. The output device(s) may be used, for example, to present user interfaces to facilitate user interaction with applications performing processes described herein and variations therein, when such interaction may be appropriate.

In an embodiment, the processing service 122 applies the inverse of the transformation 110 to the input 116 to yield the inverse transformed input 118. In accordance with at least one embodiment, the transformation 110 may be inverted such that the transformation 110 has a one-to-one mapping with its inverse. The processing service provides the inverse transformed input 118 to the remote device 120.

Figure 2:
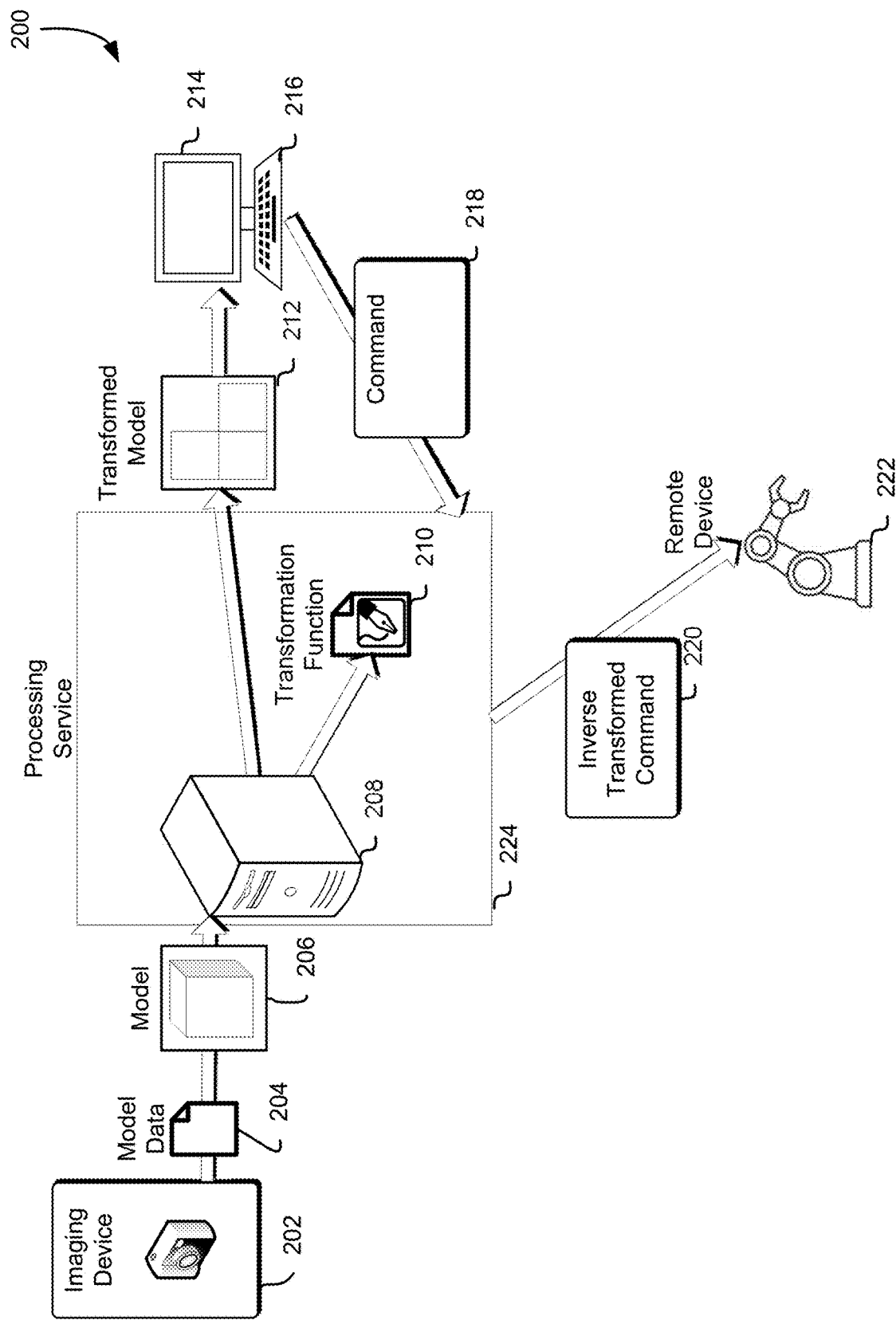
FIG. 2 illustrates an environment in which a computing system may process a model, provide the transformed model to an operator display, receive operator commands based on the transformed model, and provide inverse transformed commands to a remote device.

FIG. 2 illustrates an example environment 200 where an input based on a transformed model is inversely transformed before being provided to a remote device operating in the space represented in the transformed model, in accordance with at least one embodiment. An imaging device 201 may generate an image data 204, including at least an image 206. The imaging device 201 may be in proximity to or attached to a remote device 222. The imaging device may provide the image data 204 to a processing service 224. In accordance with at least one embodiment, the processing service 224 includes a computing system 208 with one or more computing system processors and a data storage system, such as described above, and may include such supporting infrastructure as described above. In accordance with at least one embodiment, the processing service 224 receives the image 206 and determines a warping amount associated with the image 206. The determination may be the result of comparing the image to a standard model or standard format. The determination may involve recognizing an object within the image and comparing the recognized object with a standardized model of that object. Alternatively, the determination may compare a recognized surface within the image to standardized model of that surface. The determination may invoke machine learning to aid in comparing the image to a standard model or standard format, comparing recognized objects to a standard model of that object, comparing a recognized surface with a standardized model of that surface, or a combination thereof.

Once the processing service 224 has determined the warping amount, the processing service uses the warping amount to determine a transformation 210. The transformation 210 may be determined by accessing a suitable preconfigured transformation from storage as one of a set of preconfigured transformations, the suitable preconfigured transformation based on the warping amount. The transformation 210 may also be generated from the warping amount. The processing service 224 applies the transformation 210 to the image 206 to yield the transformed model 212. The transformed model 212 is provided to a computing device including at least a display device 214 for an operator to view the transformed model 212 and an input device 216 to generate an input, such as a command 218.

The command 218 based on the transformed model 212 is provided to the processing service 224. The command 218 may correspond to a movement associated with the remote device 222. The processing service 224 applies the inverse of the transformation 210 to the command 218 to yield the inverse transformed command 220. In accordance with at least one embodiment, the transformation 210 may be inverted such that the transformation 210 has a one-to-one mapping with its inverse. The processing service 224 provides the inverse transformed command 220 to the remote device 222.

Figure 3:
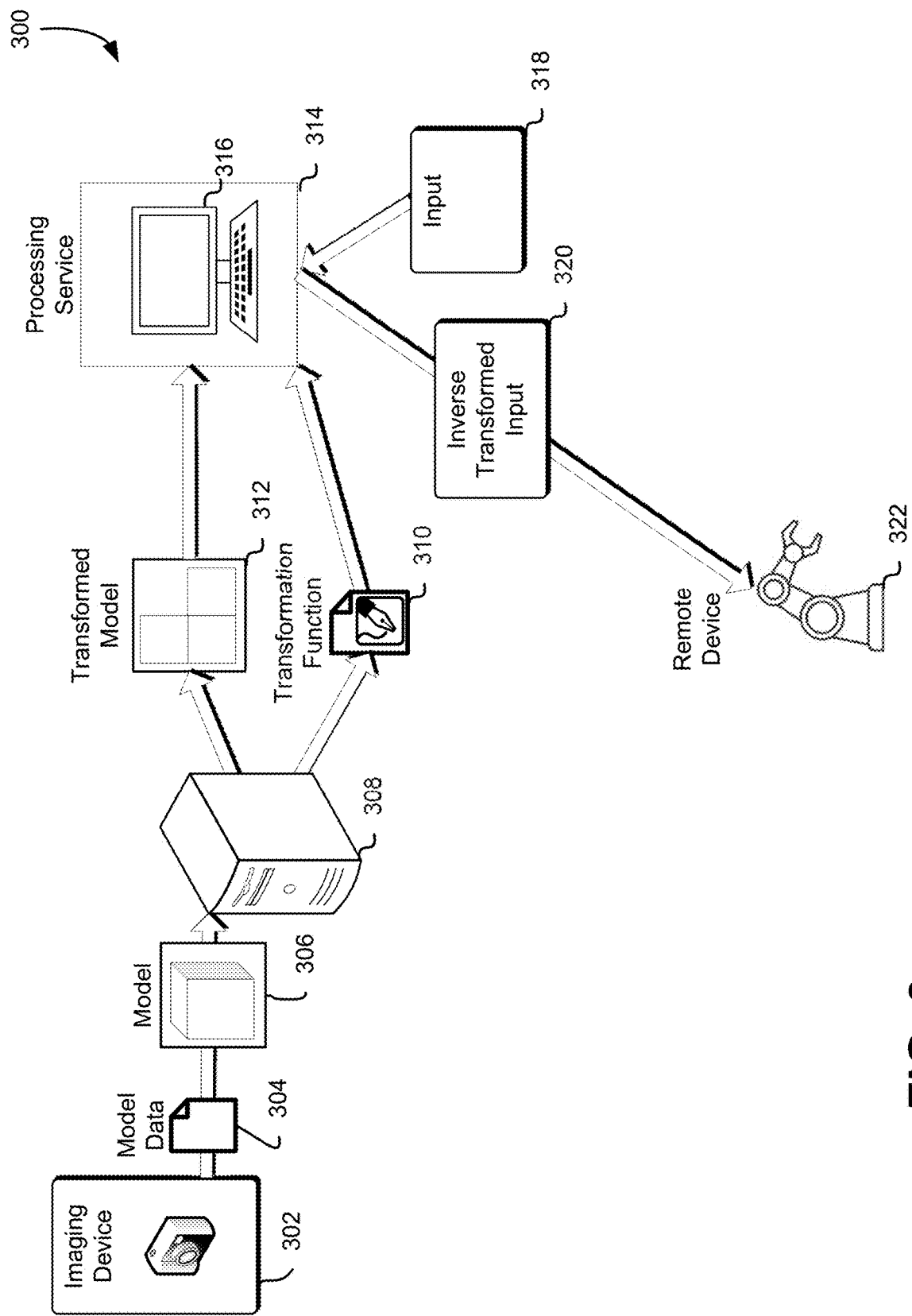
FIG. 3 illustrates a diagram of an environment in which a distributed computing system may process a model, provide the transformed model to an operator display, and provide the transformation algorithm to an operator computing device; and the operator computing device may receive operator commands based on the transformed model, and provide inverse transformed commands to a remote device.

FIG. 3 illustrates an example environment 300 where an input based on a transformed model is inversely transformed before being provided to a remote device operating in the space represented in the transformed model, in accordance with at least one embodiment. An imaging device 302 may generate an image data 304, including at least an image 306. The imaging device 302 may be in proximity to or attached to a remote device 322. The imaging device may provide the image data 304 to a computing system 308. In accordance with at least one embodiment, the computing system 308 includes one or more computing system processors and a data storage system. In accordance with at least one embodiment, the computing system 308 may include a computing device with one or more computing system processors and may include a data storage system, such as described above, and may include such supporting infrastructure as described above.

In accordance with at least one embodiment, the computing system 308 receives the image 306 and determines a warping amount associated with the image 306. The determination may be the result of comparing the image to a standard model or standard format. The determination may involve recognizing an object within the image and comparing the recognized object with a standardized model of that object. Alternatively, the determination may compare a recognized surface within the image to standardized model of that surface. The determination may invoke machine learning to aid in comparing the image to a standard model or standard format, comparing recognized objects to a standard model of that object, comparing a recognized surface with a standardized model of that surface, or a combination thereof.

The computing system 308 uses the determined the warping amount to determine a transformation 310. The transformation 310 may be determined by accessing a suitable preconfigured transformation from storage as one of a set of preconfigured transformations, the suitable preconfigured transformation based on the warping amount. The transformation 310 may also be generated from the warping amount. The computing system 308 applies the transformation 310 to the image 306 to yield the transformed model 312. The computing system 308 provides the transformed model 312 and the transformation 310 to a processing service 314. The processing service 314 includes at least a computing device 316. In accordance with at least one embodiment, the computing device 316 may include one or more computing system processors and a data storage system, such as described above, and may include such supporting infrastructure as described above. The computing device 316 may include a display device to display the transformed model 312 to an operator. The computing device 316 may receive an input 318, such as a command for movement associated with the remote device 322. Alternatively, the computing device 316 may include an input device capable of generating an input 318.

The input 318 based on the transformed model 312 is provided to the processing service 314. The processing service 314 applies the inverse of the transformation 310 to the input 318 to yield the inverse transformed input 320. In accordance with at least one embodiment, the transformation 310 may be inverted such that the transformation 310 has a one-to-one mapping with its inverse. The processing service 314 provides the inverse transformed input 320 to the remote device 322.

Figure 4:
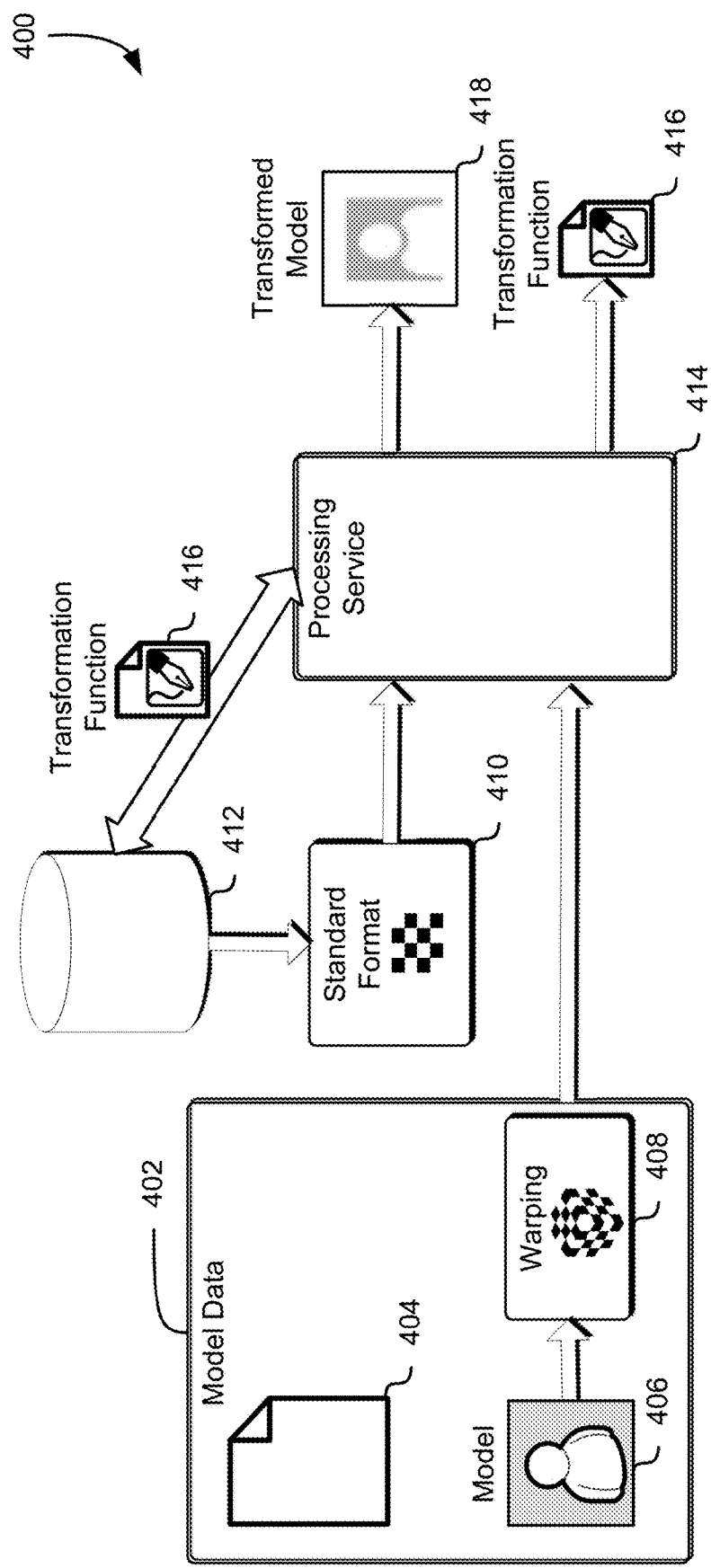
FIG. 4 illustrates a diagram in which a model is provided to a processing service for comparing to a standard format to determine a warping transformation that, when applied to the model, yields a transformed model of changed warping.

FIG. 4 illustrates an example environment 400 where image data is processed by a processing service to adjust warping in the image and provide a transformed model, in accordance with at least one embodiment. An imaging data 402 may include information data 404 detailing conditions in which the image was generated and an image 406. The processing service 414 may determine that the image includes a warping amount 408. The determination of a warping amount 408 may be the result of comparing the image 406 with warping amount 408 to a standard format 410. A standard format 410 may be represented by a rectilinear representation of the image. As such, a warping amount 408 may refer to how warped a portion of an image is relative to, for example, the standard format 410. A warping amount 408 may also be represented by one or more warping parameters in an algorithm for transforming the image 406. The algorithm may be a transformation to reduce or add warping so that image features, such as pixels, are shifted to approximate the standard format 410. Parameters may include the difference of distance and orientation between corresponding pixels of the warped, distorted, or warped and distorted image relative to the standard format. Parameters may also be derived from information associated with an imaging device's location and orientation, for example, in relation to the remote device. Further, parameters may be derived from environmental data, such as a determined distance from the imaging device to an object in the image or a determined distance between objects in the image. A determined transformation 416 with associated warping parameters enables warping the view of an image and enables an inverse transformation. The standard format 410 may be accessed from a data store 412.

The processing service 414 may, in determining the warping amount 408, determine a transformation 416 suitable for applying to the image 406. The transformation 416 may be generated, in part, from an accessed preconfigured function available at the data store 412. The transformation 416 may be generated, in part, based on the determination of the warping amount 408. The transformation 416 may be generated at least in part on a combination of an accessed preconfigured function and the warping amount 408. The processing service 414 may cause the determined transformation 416 to be stored at the data store 412. The processing service may apply the transformation 416 to the image 406 to yield a transformed model 418. The processing service 414 may cause the transformation 416 to be accessible by a computing device or computing system. The processing service 414 may provide the transformation 416 to a computing device, computing system, or display device.

Figure 5:
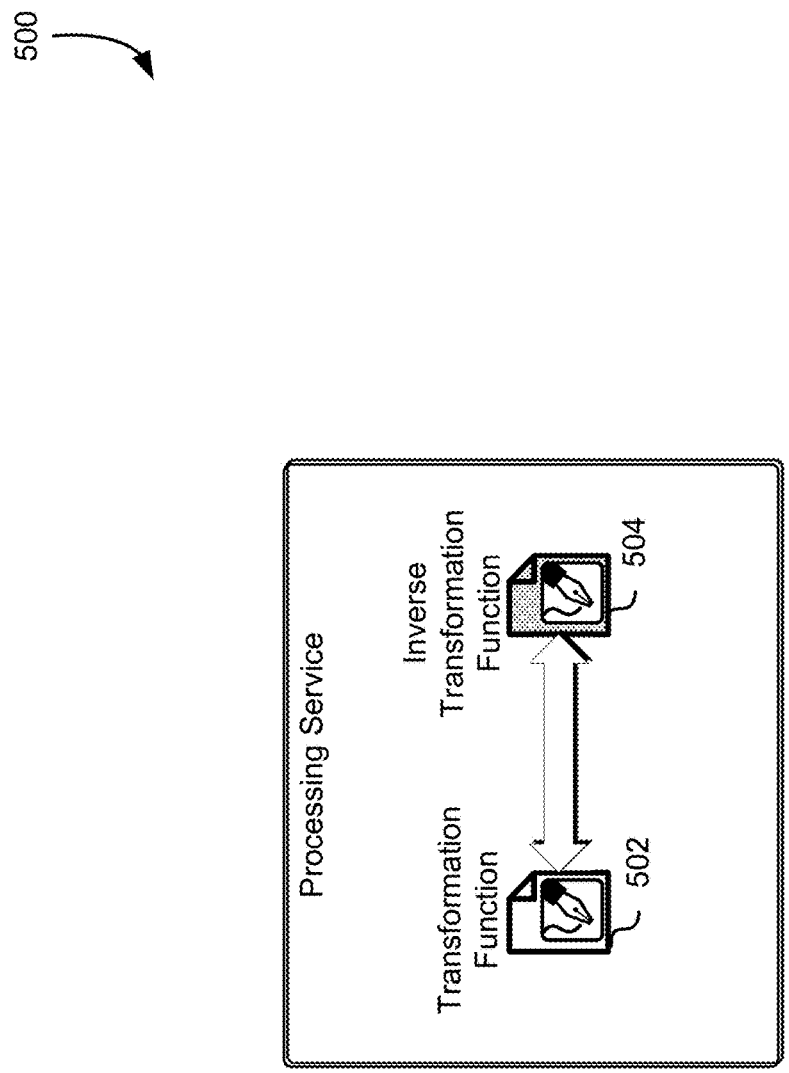
FIG. 5 illustrates a diagram in which a transformation has an inverse warping transformation.

FIG. 5 illustrates an example environment 500 for a processing service where a transformation has a one-to-one inverse function, in accordance with at least one embodiment. A processing service may invert a transformation 502 to yield an inverse transformation 504. The transformation 502 and the inverse transformation 504 may be one-to-one, such that distinctiveness of values processed by the functions is preserved.

Figure 6:
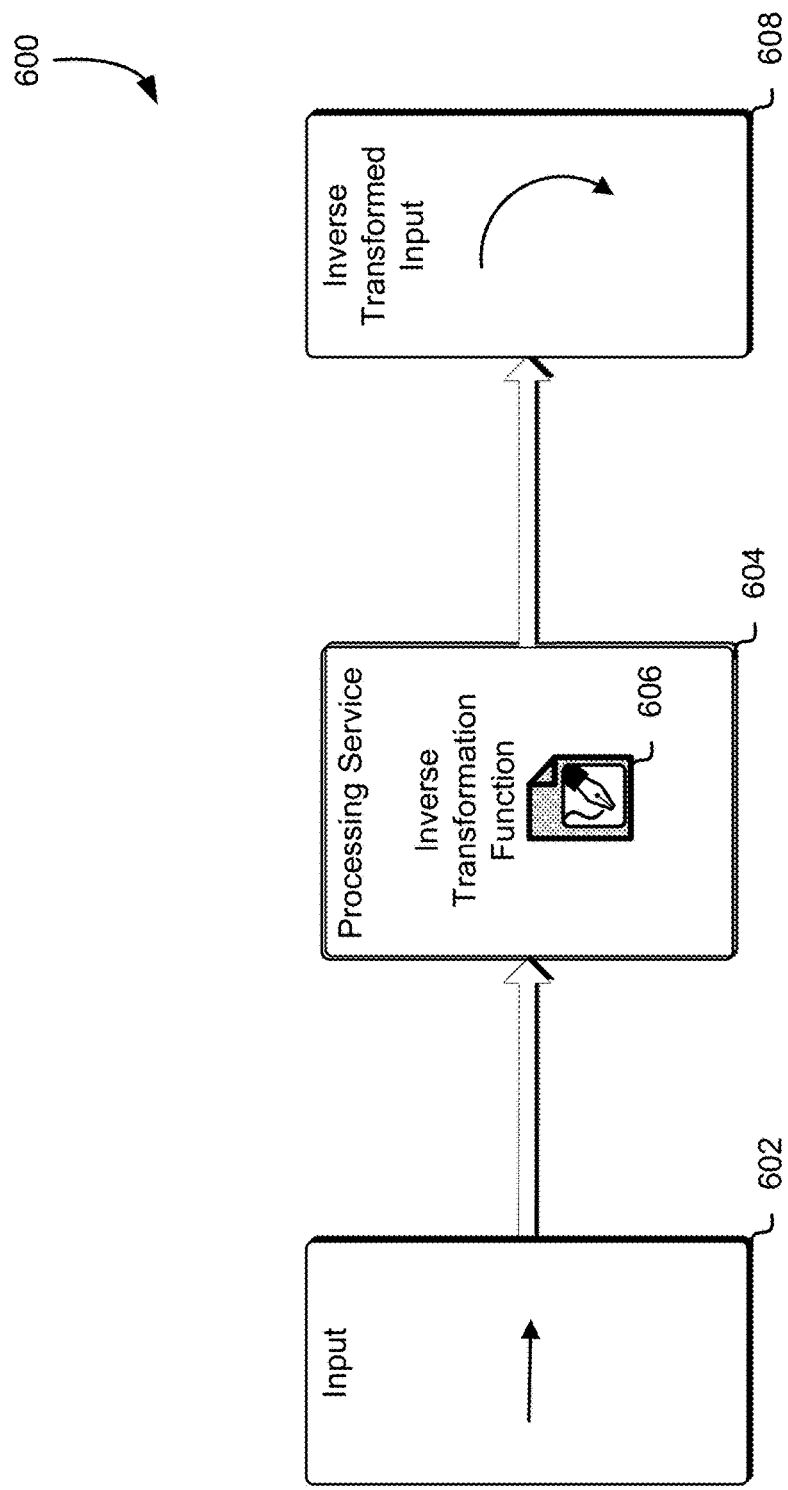
FIG. 6 illustrates a diagram in which an inverse warping transformation is applied to a command such that the command becomes an inverse transformed function.

FIG. 6 illustrates an example environment 600 for a processing service where a first input is inverse transformed to yield an inverse transformed input or second input, in accordance with at least one embodiment. An input 602 may correspond to one or more movement commands for a remote device. A processing service 604 may apply an inverse transformation function 606 to the input 602. The processing service 604 may provide the inverse transformation of the input 602 as an inverse transformed input 608. For example, linear movement in the view of the real-world scene may correspond to non-linear movement in the real-world scene according to the transformation.

The first input 602 may correspond to multiple commands for movement of at least a component of a remote device. Upon processing the first input 602 with the inverse transformation function 606, the inverse transformed input 608 may correspond to a different number of commands for movement in the real-world scene. The syntax of the input 602 maybe enable a series of commanded movements to be aggregated into a single inverse transformed input 608 when transformed. A single movement associated with input 602 may correspond to a plurality of commanded movements in the real-world scene caused by the inverse transformation.

Figure 7:
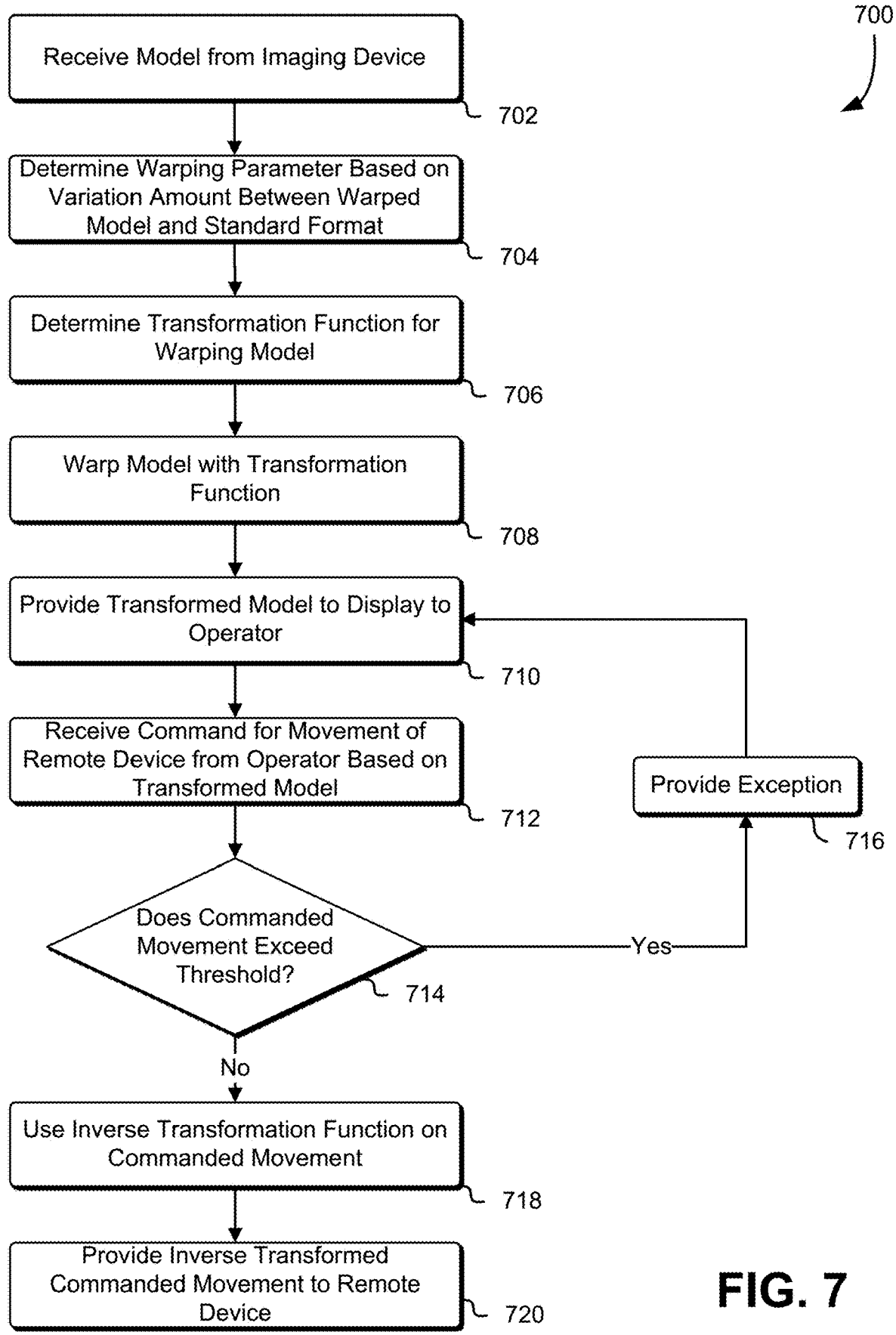
FIG. 7 illustrates a process for receiving a model, transforming the model, receiving a command based on the transformed model, and inverse transforming the command to provide to a remote device.

FIG. 7 illustrates an example process 700 for receiving an image from an imaging device and for providing an inverse command as described herein at least in connection with FIG. 1 and in accordance with at least one embodiment. Some or all of the process 700 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

In some embodiments, a component of a processing service, such as the computing system 108 described at least in connection with FIG. 1 may perform a portion of process 700. In some embodiments, a component of a processing service, such as the computing system 208 described at least in connection with FIG. 2 may perform a portion of process 700. In some embodiments, a display device, such as the display device 214, and an input device, such as the input device 216, described at least in connection with FIG. 2 may perform a portion of process 700. In some embodiments, a computing system 308 and a component of a processing service, such as a computing device 316, described at least in connection with FIG. 3 may perform a portion of process 700. In some embodiments, a processing service, such as the processing service 414, described at least in connection with FIG. 4 may perform a portion of process 700. In some embodiments, a processing service, such as the processing service environment 500, described at least in connection with FIG. 5 may perform a portion of process 700. In some embodiments, a processing service, such as the processing service environment 600, described at least in connection with FIG. 6 may perform a portion of process 700.

Figure 9:
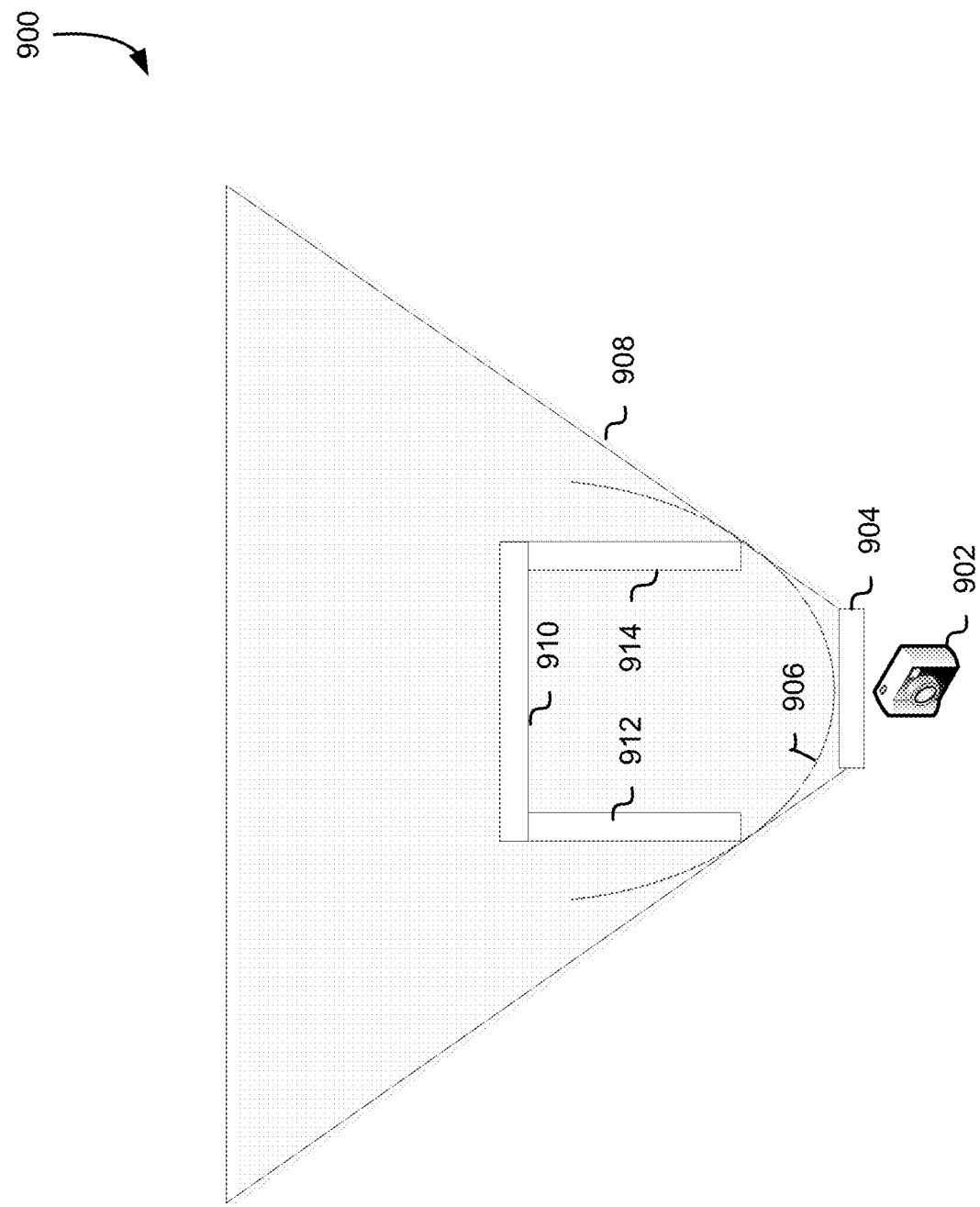
FIG. 9 illustrates a diagram of an environment in which an imaging device may capture an image of a multi-sided surface in a real-world scene to provide a model of the real-world scene.

A processing service may receive 702 an image including a view of a remote device's operating environment, such as from an imaging device. The image may be received from a network or other means of data transmission. As shown in FIG. 9, the field of view 908 depicted in the image may have an image plane, such as a curved image plane 906. In some embodiments, the imaged view may be a single image taken from a single imaging device. In alternative embodiments, the imaged view may be a set of images taken from a single imaging device, the set of images representing varied orientations of the imaging device or of varied fields of view. The set of images may be combined by a processing service (e.g. processing service 122 and processing service 224) or computing system (e.g. computing system 308). In other alternative embodiments, a set of imaging devices, such as imaging devices at various positions about the remote device, may each generate one or more images that may be similarly combined by a processing service or computing system.

The processing service determines 704 a warping parameter based on variation amount associated with the received image. A processing service, such as the processing service 414 shown in FIG. 4, may determine that an image includes a warping amount as described above. As such, a warping amount may be represented by one or more warping parameters in an algorithm for transforming the view of an image. Accordingly, applying a determined transformation associated with the warping parameters may results in warping the view of the image 406.

The processing service, for example the processing service 414, determines 706 a transformation to warp the image. The transformation may be based in part on the determined warping amount. The transformation may be determined at least in part from a preconfigured transformation of a set of preconfigured transformations. The transformation may be determined at least in part by machine learning. Further, the warping parameters enable an inverse transformation. The processing service may maintain the image, warped model, and transformation function in persistent storage for subsequent access, such as in the event the imaging device is not available to obtain another image. In this manner, the image received 702 may be an already warped model that will be transformed to account for a change, such as a commanded movement by a remote device to a different position, a changed perspective, or changed state of an object within the image.

Figure 10:
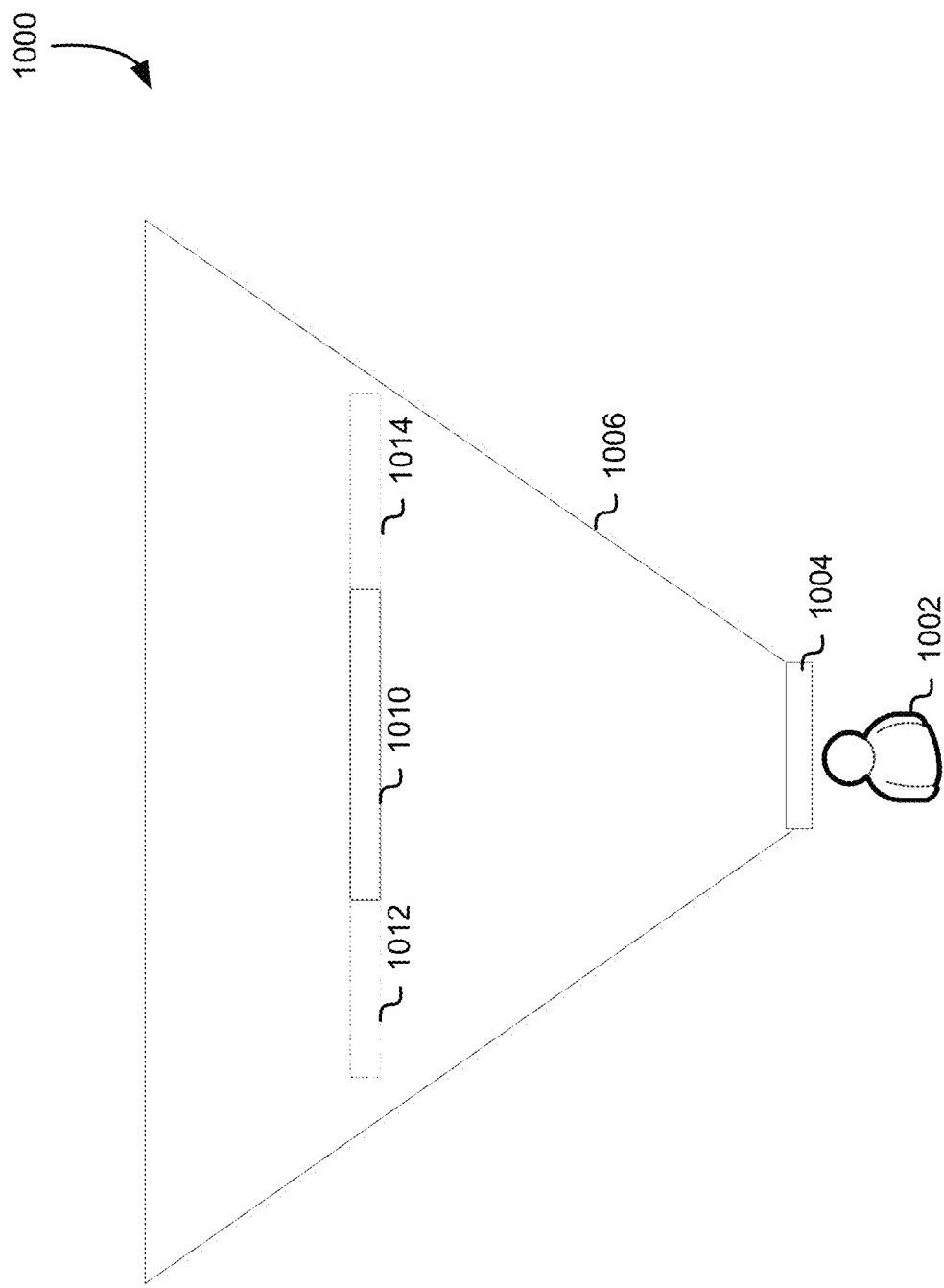
FIG. 10 illustrates a diagram of an environment in which a warped model of a multi-sided surface is provided to an operator such that the multi-sided surface is transformed to a single-sided surface.

The transformation is applied to the received image to transform 708 the image. The image may be received from an imaging device or from a suitable storage location. The result of the transformed model is to approximate the view represented by the standard format or standard model. For example, as in FIG. 4 the image 406 may be an image obtained from an imaging device or may be a transformed model accessed from storage that was previously warped. By applying the transformation 416, in reference to the standard format 410, the image 406 is transformed to transformed model 418 with adjusted stretching or warping. The algorithmic procedure associated with the transformation may, for example, apply a mathematical adjustment to the image associated with determined warping parameters. Distortion may be reduced or corrected by, for example, modifying a bitmap or pixel data in a digital image. Modifying a bitmap or pixel data can include shifting, migrating, or copying data from a pixel location to a different pixel location. Modifying a bitmap or pixel data can also include algorithmically adjusting values associated with pixel data, such as adjusting the value associated with a position or color of a pixel. For example, a spherical object in an image can be distorted such that it appears non-spherical, oblong, or otherwise warped. The algorithmic procedure would approximate the spherical appearance of the object thereby reducing distortion. It will be appreciated that an approximation may reduce distortion, completely eliminate distortion, or modify the perspective in the image. For example, FIG. 10 depicts surfaces 1010-1014 as along a parallel plane in field of view 1006 although surfaces 1010-1014 may have been transformed from the angled surfaces 810-814 in FIG. 8 or the angled surfaces 910-914 in FIG. 9.

The transformed model is provided 710 to an output device or display device for an operator to view. The image may be provided over a network or other suitable means of transmitting data. An output device or display device may be any device suitable to render the transformed model for an operator to view, as described above. For example and as seen in FIG. 1, the display device 114 receives the transformed model 112. The rendered transformed model may be displayed such that an operator can view the transformed model. The operator may also be able to view the image. The display may be connected with a computing device. The display device may be joined to an input device. For example and as seen in FIG. 2, the display device 214 is joined with an input device 216.

The processing service may receive 712 an input, such as a command for a specified movement of a remote device, in reference to the transformed model. For example, an operator may use an input device to cause an input associated with a command for the remote device to move by a specified distance of units. The input device may be a controller activated by an operator. As described above, the input device or controller can be any suitable device capable of signaling a movement of the remote device.

The processing service may process inputs from the input device. The processing service may determine 714 whether the input command for movement of the remote device exceeds a threshold. The threshold may be preconfigured. The threshold may be based in part on the warping parameters or transformation. As discussed above and will be appreciated, a threshold value may be variable across an image. For example, a threshold for movement near the perimeter of an image may be different than the threshold for movement near the center of an image based on the determined warping to apply to the image.

If the threshold is exceeded, the processing service provides 716 an exception. The exception may be provided as an alert to a display device or computing device used by the operator. The exception may be an automatic adjustment of the input command for movement. For example, an input corresponding to a movement that exceeds the threshold may be reduced to the threshold. In this manner, the remote device may execute some movement in the direction indicated by the operator though the specified input exceeds the threshold. The exception may cause a timed delay in movement. For repeated inputs of the same or similar movement, the exception may not be provided for such repeats inputs. The exception may prevent the input for movement to be provided to the remote device.

A movement value specified by the input command for movement, or by an adjusted input command, that does not exceed the threshold is inversely transformed 718 by a processing service using the inverse of the transformation. For example, an input command may be expressed as a movement vector of a magnitude value and direction value in reference to the transformed model. Applying the inverse transformation to the movement vector may modify the magnitude value, direction value, or both such that the movement is in reference to the image. As shown in FIG. 5, an inverse transformation 504 may correspond with transformation 502 according to a one-to-one relationship. As such, distinctiveness of mapped values processed by the functions is preserved.

The inverse transformed command may be provided 720 by the processing service to a remote device. The inverse transformed command may be provided by any suitable means for transmitting data, such as network communication. The remote device may respond to the processing service indicating successful receipt of the inverse transformed command. The remote device may indicate to the processing service when the associated movement of the inverse transformed command is complete.

In some embodiments, the commanded movement may cause an update to the transformed model. For example, an initial image mapping the environment of operation of a remote device may be obtained from an imaging device, starting from an initial perspective. Once the commanded movement is processed, the perspective of the view of the transformed model may be updated and stored at a storage location. The processing service may track that an object in the transformed model would be moved or altered by the commanded movement. In some embodiments, the processing service may access the stored transformed model and update the transformed model with a determined new perspective or position associated with the commanded movement. In some embodiments, the processing service may access the stored transformed model and may update the transformed model with a determined new state of an object moved or altered by the commanded movement. In this manner, an operator may view updates to a perspective view or state of objects in the view without obtaining an image from the imaging device after the commanded movement was executed.

Although depicted as a sequence of operations, those of ordinary skill in the art will appreciate that a depicted order should not be construed as limiting the scope of the present disclosure and that at least some of the depicted operations may be altered, omitted, reordered, supplemented with additional operations, or performed in parallel. Embodiments of the depicted process may be implemented using various combinations of computer-executable instructions executed by a computing system, such as the computing systems described herein. Unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine (e.g., computer configured with processors that process the instructions), thereby causing the machine to perform the specified operations.

Figure 8:
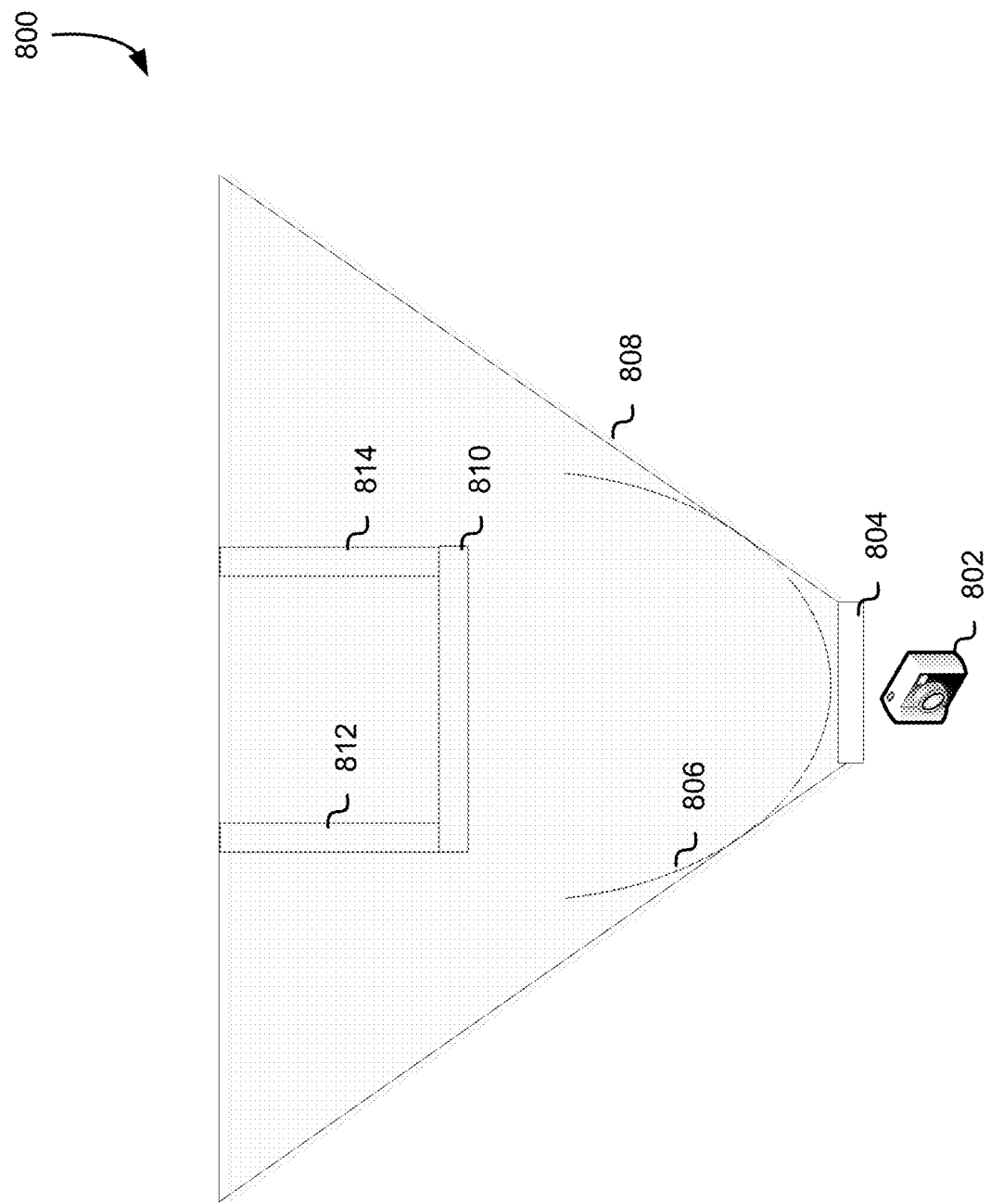
FIG. 8 illustrates a diagram of an environment in which an imaging device may capture an image of a multi-sided surface in a real-world scene to provide a model of the real-world scene.

FIG. 8 illustrates an example environment 800 for conditions associated with how an image may be generated. An imaging device 802 has an image plane 804. The image plane 804 represents a reduction in a comparatively larger field of view 808. The field of view 808 may have an image plane, such as a curved image plane 806. The field of view 808 may directly face a surface 810 such that the image plane 804 is substantially parallel to the surface 810. The field of view 808 may include an angled surface 812 or 814.

The imaging device 802 may be moved such that the image plane is less angled relative to angled surface 812 or 814. The imaging device 802 may be moved such that the image plane is substantially parallel with surface 812. The imaging device 802 may generate an image when the image plane is substantially parallel with the surface 810. The imaging device 802 may generate an image after it has been moved such that the image plane is substantially parallel with surface 812.

FIG. 9 illustrates an example environment 900 for conditions associated with how an image may be generated. An imaging device 902 has an image plane 904. The image plane 904 represents a reduction in a comparatively larger field of view 908. The field of view 908 may have an image plane, such as a curved image plane 906. The field of view 908 may directly face a surface 910 such that the image plane 904 is substantially parallel to the surface 910. The field of view 908 may include an angled surface 912 and 914. The curved image plane 906 may include the surfaces 910, 912, and 914.

FIG. 10 illustrates an example environment 1000 for conditions associated with how an image may be transformed as described herein at least in connection with FIGS. 1, 2 and 3, and in accordance with at least one embodiment. In some embodiments, surfaces, such as the parallel surface 810, and angled surfaces, such as surface 812 and surface 814, described at least in connection with FIG. 8 may relate to a portion of environment 1000. In some embodiments, surfaces, such as the parallel surface 910, and angled surfaces, such as surface 912 and surface 914, described at least in connection with FIG. 9 may relate to a portion of environment 1000. An operator 1002 may view an image plane 1004. The image plane 1004 may represent a transformed model with a field of view 1006. For example, within the field of view 1006, a parallel surface 1010 appears substantially parallel to the image plane 1004.

Transformed surface 1012 and transformed surface 1014 may appear along a similar plane of view as surface 1010, such as being substantially parallel to the image plane 1004. Transformed surface 1012 may represent surface 812 in connection with FIG. 8. Transformed surface 1014 may represent surface 814 in connection with FIG. 8. Transformed surface 1012 may represent surface 912 in connection with FIG. 9. Transformed surface 1014 may represent surface 914 in connection with FIG. 9. In some embodiments, one or more images for each adjacent surface are combined into a composite image. For example, a first image may be a view of surface 912, a second image may be a view of surface 910, and a third image may be a view of surface 914. In combining such surfaces to result in the composite view, including surfaces 1010, 1012, and 1014, the transformation includes parameters to account for the adjusted angle of incidence between the surfaces. The composite view may appear to even out, or substantially reduce, the dimensionality of the transformed model. As such, an operator may position recognized surfaces in a non-realistic manner that, for example, improves the operator's ability to view multiple surfaces together in a virtual environment. For example, the surfaces 1010, 1012, and 1014 appear substantially parallel to the perspective of operator 1002 compared to the more highly angled, or more characterized by depth, space exhibited by surfaces 912 and 914 relative to surface 910.

Figure 11:
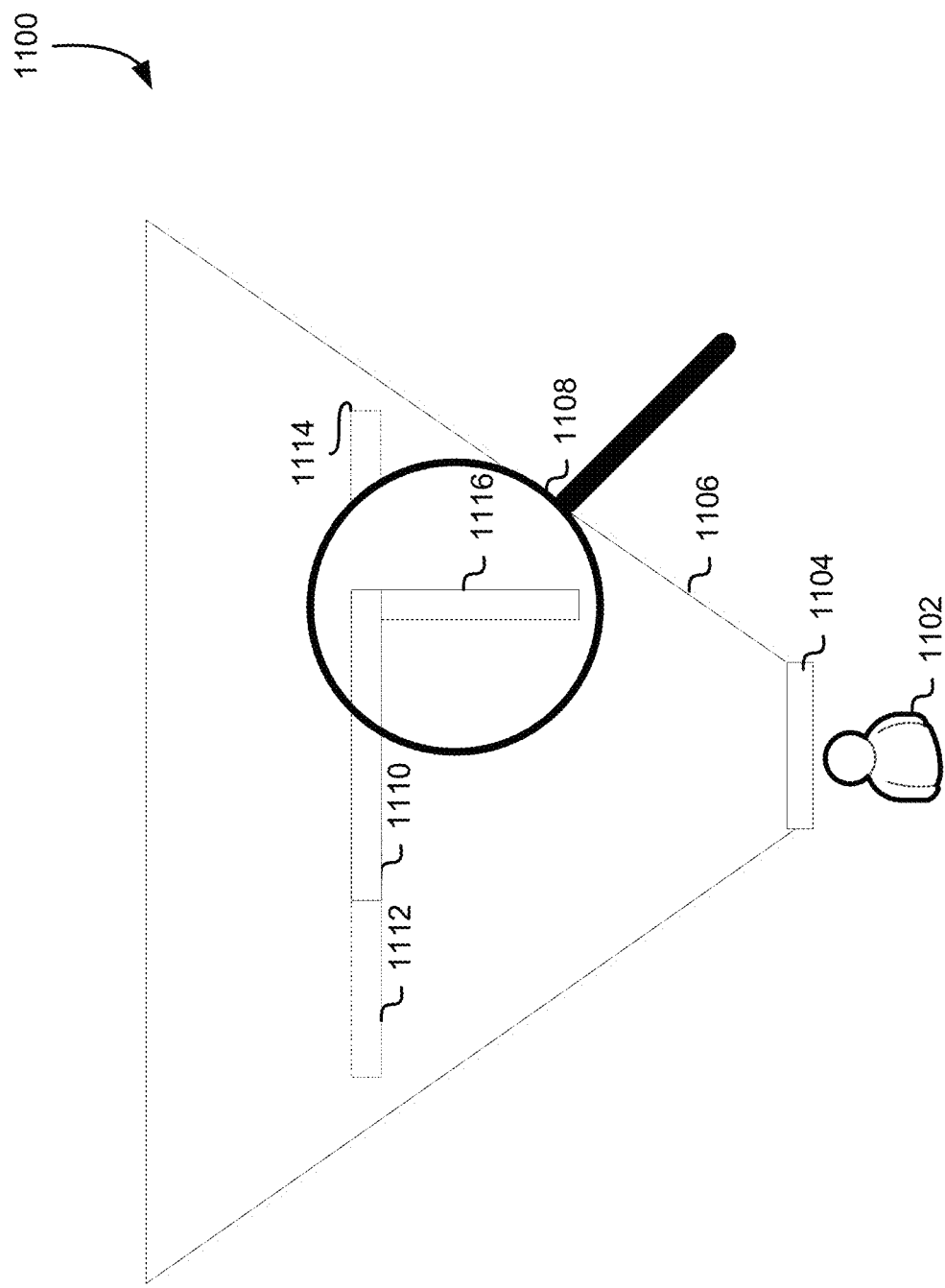
FIG. 11 illustrates a diagram of an environment in which a partially warped model of a multi-sided surface is provided to an operator such that the multi-sided surface is transformed to a single-sided surface, except for a localized region of the warped model with different warping.

FIG. 11 illustrates an example environment 1100 for conditions associated with how an image may be transformed as described herein at least in connection with FIGS. 1, 2, and 3, and in accordance with at least one embodiment. In some embodiments, surfaces, such as the parallel surface 810, and angled surfaces, such as surface 812 and surface 814, described at least in connection with FIG. 8 may relate to a portion of environment 1100. In some embodiments, surfaces, such as the parallel surface 910, and angled surfaces, such as surface 912 and surface 914, described at least in connection with FIG. 9 may relate to a portion of environment 1100. An operator 1102 may view an image plane 1104. The image plane 1104 may represent a transformed model with a field of view 1106 and a localized field of view 1108 with a different transformation function applied. The localized field of view 1108 may be a view without a transformation function applied, such that an operator 1102 may view a portion of the field of view 1106 that approximates the real-world view, such as that of view 908. For example, within the field of view 1106, a parallel surface 1110 appears substantially parallel to the image plane 1104 while the localized view 1108 enables surface 1116 to appear as it is situated, such as surface 914 in the real-world view 908. Outside the bounds of the localized view 1108, the surface 1114 corresponds to how surface 1116 may be orientated with a transformation function applied.

Figure 12:
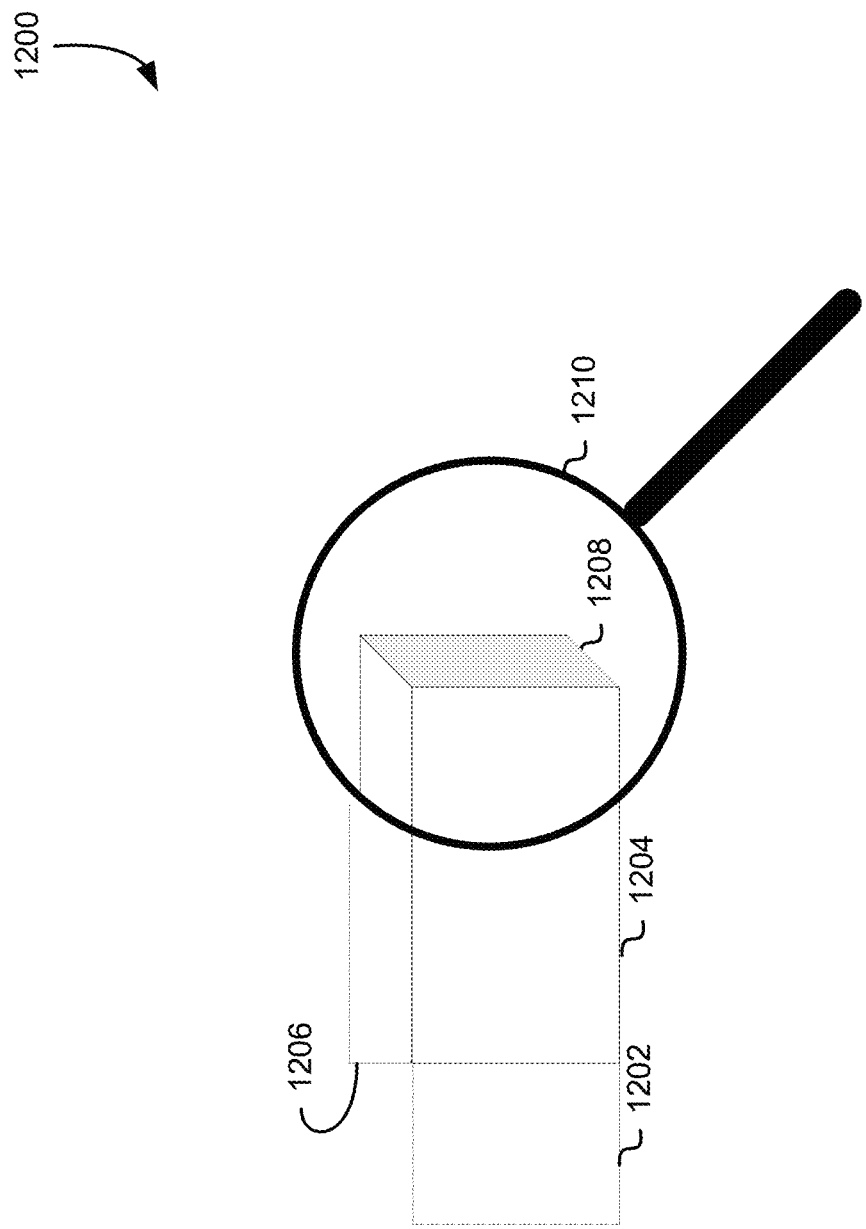
FIG. 12 illustrates a diagram of an environment in which a partially warped model of a multi-sided surface such that the multi-sided surface is transformed to a single-sided surface, except for a localized region of the warped model with different warping.

FIG. 12 illustrates an example environment 1200 for conditions associated with how a scene in an image may be transformed and displayed simultaneously with a localized view 1210. A transformation may virtually fold out the sides of a cube such that a real-world scene may appear with the surfaces of a box substantially parallel. For example, surfaces 1202 and 1206 have been virtually warped to appear along the same plane as surface 1204. Localized view 1210 reduces this warping to show that the plane of surface 1208 is angled relative to the plane of surfaces 1202, 1204, and 1206.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization, and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C#, or C++, or any scripting language, such as Ruby, PHP, Perl, Python, or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of storage locations, such as data stores and other memory and storage media, as discussed above, which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers, or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

What is claimed is:

1. A computer-implemented method, comprising:
    obtaining a model of a real-world scene;
    applying a warping transformation to the model to result in a transformed model;
    obtaining a first input to cause movement of at least a component of a device according to the transformed model;
    determining a second input to move at least the component of the device in the real-world scene in a way that corresponds to the movement of the at least the component of the device according to the transformed model; and
    providing the second input to the device to cause the device to move in the real-world scene.

2. The computer-implemented method of claim 1, wherein the second input is determined based at least in part on an inverse of the warping transformation.

3. The computer-implemented method of claim 1, wherein the warping transformation morphs an object in the model.

4. The computer-implemented method of claim 1, wherein the warping transformation comprises stitching multiple models together.

5. The computer-implemented method of claim 1, wherein the first input comprises multiple commands and the second input comprises a different number of commands than the first input.

6. The computer-implemented method of claim 1, further comprising:
    providing a visual overlay of the transformed model, the visual overlay indicating relative amounts of reduced warping across the transformed model.

7. The computer-implemented method of claim 1, wherein the transformation further comprises modifying the planar orientation of a first surface relative to a second surface represented in the model.

8. A system, comprising:
    one or more processors; and memory storing computer-executable instructions that, as a result of execution by one or more processors, cause the system to:

obtain a model resulting from applying a warping transformation to a model of a real-world scene to display a warped view of the real-world scene;

determine, based on an instruction to navigate a device within the warped view, at least one command to cause the device to navigate in the real-world scene in a corresponding manner; and provide the determined at least one command to the device.

9. The system of claim 8, wherein the instruction that causes the system to determine the at least one command, when executed, causes the system to determine multiple commands for navigation in the real-world scene that correspond to a warped command in the warped view of the real-world scene.

10. The system of claim 8, wherein obtaining the model comprises generating the model based on the warping transformation.

11. The system of claim 10, wherein generating the model comprises accessing a stored model.

12. The system of claim 8, wherein the warping transformation non-uniformly transforms distances from the real-world scene to the warped view of the real-world scene.

13. The system of claim 8, wherein the warped view of the real-world scene, wherein linear movement in the warped view of the real-world scene corresponds to non-linear movement in the real-world scene according to the warping transformation.

14. A non-transitory computer-readable storage medium having stored thereon executable instructions that, based at least in part on being executed by one or more processors of a computer system, cause the computer system to at least:

obtain instructions to navigate a device within a warped view of a real-world scene to cause the device to move from a first location in the warped view of the real-world scene to a second location in the warped view of the real-world scene;

determine, based on the instructions, commands to cause the device to navigate in the real-world scene from a first location in the real-world scene to a second location in the real-world scene, wherein the first location in the real-world scene corresponds to the first location in the warped view of the real-world scene and the second location in the real-world scene corresponds to the second location in the warped view of the real-world scene; and provide the determined commands to the device.

15. The non-transitory computer-readable storage medium of claim 14, wherein determining the commands is based on an inverse of a transformation applied to generate the warped view of the real-world scene.

16. The non-transitory computer-readable storage medium of claim 14, wherein the executable instructions further comprise instructions to cause the computer system to selectively display the warped view of the real-world scene and another view of the real-world scene.

17. The non-transitory computer-readable storage medium of claim 14, wherein the executable instructions further comprise instructions to cause the computer system to receive input indicating a result of navigation of the device in the warped view of the real-world scene and determine, based on the result, a set of commands to cause the device to achieve the result in the real-world scene.

18. The non-transitory computer-readable storage medium of claim 14, wherein the executable instructions further comprise instructions to cause the computer system to use an overlay to indicate amounts of warping applied to generate the warped view of the real-world scene.

19. The non-transitory computer-readable storage medium of claim 14, wherein the commands are determined based on an inverse of a warping transformation used to generate the warped view of the real-world scene.

20. The non-transitory computer-readable storage medium of claim 14, wherein the device is remote from the computer system.

* * * * *